United States Patent [19]

Walters et al.

[11] Patent Number: 4,902,879
[45] Date of Patent: Feb. 20, 1990

[54] AIRCRAFT BILAYER APPENDAGE

[75] Inventors: Patricia B. Walters, Capshaw; Connie J. Parvin, New Market; Gary M. Cribbs, Athens; Radford French, Arab. all of Ala.; Joseph T. Mueller, Florence, KY

[73] Assignee: PPG Industries, Inc., Pittsburgh, Pa.

[21] Appl. No.: 138,614

[22] Filed: Dec. 28, 1987

[51] Int. Cl.$^4$ .............................................. H05B 3/28
[52] U.S. Cl. ................... 219/522; 219/203; 219/526; 219/548; 219/536; 98/90; 296/96.11
[58] Field of Search ............... 219/203, 542, 543, 546, 219/547, 522, 526, 536, 548; 52/171; 98/90; 296/84.1, 96.11, 96.14, 96.21

[56]  References Cited
U.S. PATENT DOCUMENTS

| | | | |
|---|---|---|---|
| 3,721,595 | 3/1973 | Tarnopol et al. | 219/203 |
| 3,971,178 | 7/1976 | Mazzoni et al. | 52/172 |
| 4,078,107 | 3/1978 | Bitterice et al. | 219/203 |
| 4,128,448 | 12/1978 | Bitterice et al. | 219/203 |
| 4,278,875 | 7/1981 | Bain | 219/203 |
| 4,399,347 | 8/1983 | Schmitt | 219/203 |

Primary Examiner—Bruce A. Reynolds
Assistant Examiner—Leon K. Fuller
Attorney, Agent, or Firm—Andrew C. Siminerio

[57] ABSTRACT

A heated bilayer appendage is provided for mounting outboard of an existing non-heated aircraft window. The appendage prevents moisture or frost accumulation on the outboard surface of the appendage so that a clear viewing area is maintained through that portion of the windshield over which the appendage is mounted. The appendage may be provided with an anti-static coating to prevent static charge accumulation on the appendage.

20 Claims, 1 Drawing Sheet

AIRCRAFT BILAYER APPENDAGE

BACKGROUND OF THE INVENTION

1. Field of the Invention

The present invention relates to add-on window structures to an aircraft, and in particular, to a heated aircraft bilayer window appendage to be mounted outboard of an aircraft windshield.

2a. Technical Considerations

It is common practice in the aircraft industry to heat part or all of an aircraft window in order to prevent fogging or ice from forming on the window that will impede clear viewing therethrough. This is particularly important in the aircraft windshield. In aircraft where the heating is not incorporated into the main windshields, add-on windows or appendages must be used to heat the viewing portion of the windshield. These add-on windows may be fabricated from bonded acrylic plies with the heating arrangement, such as heating wires, bonded therebetween. With such an arrangement, the exposed acrylic surface is subjected to scratching and environmental degradation that will shorten the useful operating life of a window appendage.

It would be beneficial to provide an arrangement to heat aircraft windows that do not otherwise have heating capabilities while also providing good durability and long service life.

2b. Patents of Interest

U.S. Pat. Nos. 3,721,595 to Tarnopol and 4,057,671 to Shoop teach heating a glass panel. In Tarnopol et al. the glass panel is the rear window of an automobile and the window is heated by a circuit pattern of an electroconductive frit composition deposited on the inboard surface of the rear window. In Shoop, a laminated window assembly is heated by plurality of electroconductive wires extending across the window and connected to a bus bar.

U.S. Pat. Nos. 4,078,107 and 4,128,448 to Bitterace et al. teach a transparent window with a static electricity dissipating circuit and a heating circuit. The circuits are embedded in opposing major surfaces of an acrylic plastic sheet which is thereafter laminated between two glass plies.

U.S. Pat. No. 3,971,178 teaches an add-on window to convert a single glazed window into a multiple glazed window. An additional pane, with a spacer attached, is hermetically sealed to an installed pane so as to provide a moisture resistant barrier and/or improved structural strength.

SUMMARY OF THE INVENTION

The present invention provides a bilayer window appendage for use with aircraft windows that do not have window heating capabilities. Heating wires are positioned between glass and plastic plies of the window appendage which thereafter is positioned over and spaced from the main aircraft window. Strap members provided along the edge of the window appendage are used to bolt the appendage directly to the airframe. Resilient seals positioned about the peripheral edge of the appendage conform to and seal the appendage against the main aircraft window. In one particular embodiment of the invention, the outer ply of the appendage is a chemically tempered glass ply and the inner ply is a polycaprolactone urethane ply. In addition, an anti-static coating may be provided on the exposed major surface of the window appendage to collect static charges accumulating on the window appendage and direct the collected charges to a ground.

DETAILED DESCRIPTION OF THE INVENTION

The present invention is presented as a bilayer appendage for an aircraft windshield, but it should be understood that the present invention may be used in any application where a heating arrangement is required to be added to an existing window or transparency.

Figure 1:
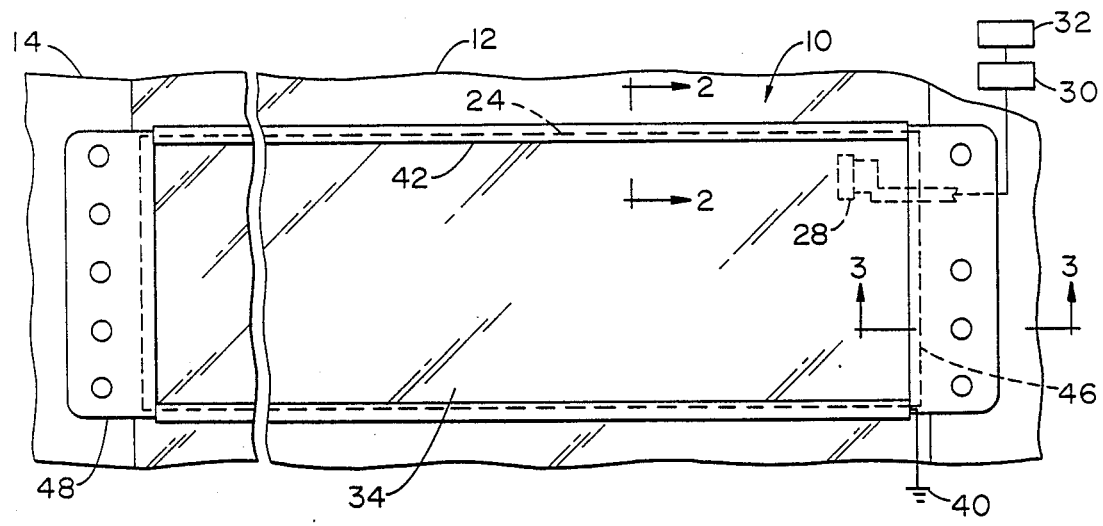
FIG. 1 is a plan view of a bilayer window appendage incorporating features of the present invention.
Figure 2:
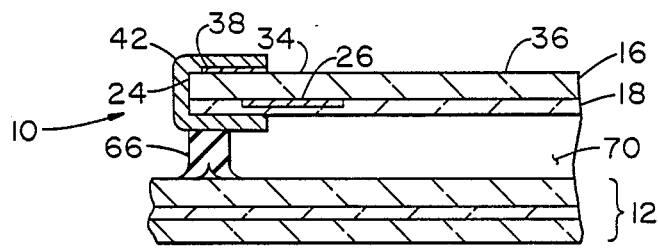
FIG. 2 is a view through line 2—2 of FIG. 1 illustrating the bilayer construction and heating wires of the present invention.
Figure 3:
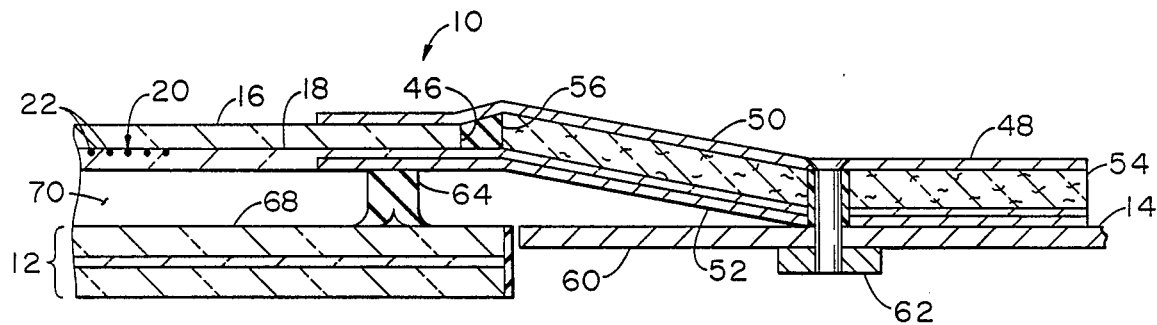
FIG. 3 is a view through line 3—3 of FIG. 1 illustrating the mounting arrangement of the present invention.

Referring to FIGS. 1 through 3, add-on window, i.e., appendage 10, is mounted outboard of an aircraft window 12 on airframe 14 in a manner to be discussed later. Appendage 10 is of a bilayer construction with an outer glass ply 16 secured to a flexible inner ply 18 by any convenient technique known in the art such as, for example, laminating. Plies 16 and 18 are contoured to match the curved configuration of the underlining aircraft window 12. A heating system 20 is incorporated into the appendage 10 to heat the appendage 10 and prevent ice formation or fogging. Although not limiting in the present invention, in a particular embodiment illustrated in FIG. 2, a plurality of wires 22 are positioned between glass ply 16 and inner ply 18. The wires 22 may be positioned in a manner similar to that disclosed in U.S. Pat. No. 4,078,107 to Bitterace, which teachings are incorporated by reference. Wires 22 extend to the longitudinally extending edge 24 of the appendage 10 where they overlie bus bars 26 as shown in FIG. 2. As an alternative the heating system 20 may include a conductive film (not shown) incorporated into the appendage 10 and electrically connected to bus bars 26. A temperature sensor 28 that monitors the appendage temperature, connects to a controller 30 which in turn connects to a power source 32 to control the power application to the bus bars 26. If desired, an anti-static coating 34 may be applied to surface 36 of glass ply 16 to collect static charge accumulated on the surface 36. The charge is directed from coating 34 through bus bars 38 to a ground 40 such as, for example, the airframe 14. The draining of the static charge buildup prevents electrical discharge through ply 16 to the heating wires 22 which may damage the appendage 10. Side straps 42 extend along and wraparound the longitudinally extending edge 24 of the appendage 10 as illustrated in FIG. 2 to protect and seal the edge. Bonding tape may be used to secure the straps 42 to the covered surfaces of glass ply 16 and inner ply 18.

Appendage 10 is mounted to the airframe 14 along its edges 46 via assembly 48. Straps 50 and 52 of assembly 48 extend along and overlie a portion of edge 46. A mounting strip 54 is positioned between straps 50 and 52 and bumper material 56 is positioned between edge 46 of the appendage 10 and the mounting strip 54 to fill any space therebetween. As with side straps 42, a bonding tape may be used to secure straps 50 and 52 to the material in which they overlay. Edge 56 of assembly 48 may be primed and sealed to prevent delamination of straps 50 and 52.

Appendage 10 is secured to the airframe 14 by bolts 58 extending through assembly 48 and airframe skin 60 and into threaded plate 62 as illustrated in FIG. 3. Seals 64 and 66 are secured to straps 42 and 52, respectively, and are positioned about the inboard periphery of the appendage 10. When bolted in place, seals 64 and 66 compress, maintaining appendage 10 in a spaced relationship from the outboard surface 68 of the aircraft window 12 while sealing space 70 from moisture, air, etc. In addition, the resilient nature of the seals 64 and 66 provides additional flexibility and compliance of the appendage 10 so that pressure applied to the appendage 10 will compress the seals but will not adversely affect the underlining aircraft window 12. Openings (not shown) may extend through seal 58 to allow any accumulated moisture between appendage 10 and aircraft window 12 to escape.

In one particular embodiment of the invention, the appendage 10 included a 0.10 inch (0.25 cm) thick chemically tempered glass ply 16 laminated to a 0.06 inch (0.15 cm) thick polycaprolactone urethane inner ply 18. Other combinations of glass and inner plies, such as thermally tempered glass and other extruded thermoplastic liners may be used, but the chemically tempered glass provides high strength with reduced thickness and weight and the polycaprolactone urethane liner provides good environmental resistance. Straps 42, 50, and 52 were 0.01 inch (0.25 mm) thick fiberglass strips such as P-600 fiberglass available from U.S. Prolam, Connecticut. Mounting strips 54 were a rigid phenolic resin impregnated paper and bumper 56 was a silicone rubber. The glass/urethane perimeter of the appendage 10 included a primer coat of DC-1200 which is a silane based primer, and a layer of RTV-732 rubber, both available from Dow Corning, Michigan. Seals 64 and 66 were a silicone rubber with sufficient compressibility and environmental resistance to seal appendage 10 against the aircraft window 12 while maintaining its compliancy under varying environmental and load conditions. An anti-static coating 34 of antimony tin oxide is provided on the surface 36 of ply 16. Bus bars 26 were a tin and lead covered copper strip and bus bar 38 was a copper foil tape secured in place by an electrically conductive adhesive.

The present invention provides an add-on window unit for use with an existing aircraft window. The appendage 10 may be any size required and provided with both anti-static and heating capabilities. The outer glass ply provides a scratch resistant layer that will withstand environmental abuse better than existing acrylic plies.

The form of the invention described and illustrated herein represents a description of an illustrative preferred embodiment thereof. It is understood that various changes can be made without departing from the spirit of the invention defined in the claimed subject matter that follows.

We claim:

1. A transparent appendage for an aircraft window mounted in a airframe comprising:
   an outer glass ply;
   an inner flexible ply secured to said glass ply;
   means to heat said plies;
   strap members secured to edge portions of said piles;
   means to secure said strap members to an airframe such that said plies are positioned outboard of an aircraft window mounted in said airframe; and
   means to maintain said plies in spaced relation from said aircraft window.

2. The appendage as in claim 1 wherein said heating means includes heating wires positioned between said glass and said inner plies.

3. The plies as in claim 2 further including means to monitor the temperature of said appendage and means to control the temperature of said plies in response to said monitoring means.

4. The appendage as in claim 2 wherein said securing means includes bolt members extending through said strap members to secure said strap members to said airframe.

5. The appendage as in claim 2 wherein said maintaining means includes means to seal at least a portion of the peripheral edge of said inner ply with said window.

6. The appendage as in claim 5 wherein said sealing means includes a resilient member extending about the periphery of said inner ply between said inner ply and said window.

7. The appendage as in claim 5 further including means to collect static charges accumulating on the outboard surface of said glass ply and means to direct said collected charges to a ground.

8. The appendage as in claim 7 wherein said static charge collecting means includes an anti-static coating on the exposed major surface of said glass ply.

9. The appendage as in claim 7 wherein said glass ply is a chemically tempered glass ply and said flexible inner ply is an environmentally stable plastic ply.

10. The appendage as in claim 9 wherein said flexible inner ply is a polycaprolactone urethane ply.

11. The appendage as in claim 10 further including means to monitor and control the temperature of said appendage plies.

12. The appendage as in claim 11 wherein said sealing means includes a resilient member extending about the periphery of said inner ply between said inner ply and said window.

13. The appendage as in claim 5 wherein said glass ply is a chemically tempered glass ply and said flexible inner ply is an environmentally stable plastic ply.

14. The appendage as in claim 13 wherein said flexible inner ply is a polycaprolactone urethane ply.

15. The appendage as in claim 14 further including means to monitor and control the temperature of said plies.

16. The appendage as in claim 15 wherein said sealing means includes a resilient member extending about the periphery of said inner ply between said inner ply and said window.

17. A method of mounting a transparent appendage for an aircraft window mounted to an airframe comprising:
   providing a transparency having an outer glass ply, an inner flexible ply secured to said glass ply, means to heat said plies, and strap members secured to edge portions of said plies;
   securing said strap members to an airframe such that said plies are positioned outboard of an aircraft window mounted in said airframe; while
   maintaining said plies in spaced relation from said aircraft window.

18. The method as in claim 17 wherein said securing step includes extending bolt members through said strap members to secure said strap members to said airframe.

19. The method as in claim 17 wherein said maintaining step includes sealing at least a portion of the peripheral edge of said inner ply with said window.

20. The appendage as in claim 19 wherein said sealing step includes extending a resilient member about the periphery of said inner ply between said inner ply and said window.

* * * * *